United States Patent [19]

Latsch et al.

[11] 4,380,986

[45] Apr. 26, 1983

[54] METHOD AND APPARATUS FOR CLOSED-LOOP CONTROL OF THE AIR NUMBER IN A SELF-IGNITING INTERNAL COMBUSTION ENGINE

[75] Inventors: Reinhard Latsch, Vaihingen; Heinz Schöber, Bietigheim-Bissingen; Gerhard Müller, Asperg; Valerio Bianchi, Neuss, all of Fed. Rep. of Germany

[73] Assignee: Robert Bosch GmbH, Stuttgart, Fed. Rep. of Germany

[21] Appl. No.: 204,136

[22] Filed: Nov. 5, 1980

[30] Foreign Application Priority Data

Nov. 7, 1979 [DE] Fed. Rep. of Germany ....... 2944834

[51] Int. Cl.³ .............................................. F02B 3/00
[52] U.S. Cl. .................................. 123/489; 123/440; 204/195 S
[58] Field of Search .................. 123/489, 440; 60/276, 60/285; 204/195 S, 15

[56] References Cited

U.S. PATENT DOCUMENTS

| | | | |
|---|---|---|---|
| 3,908,366 | 9/1975 | Masaki | 60/277 |
| 4,023,359 | 5/1977 | Masaki et al. | 60/277 |
| 4,210,106 | 7/1980 | Wessel et al. | 60/276 |
| 4,214,563 | 7/1980 | Hosaka | 123/489 |
| 4,226,692 | 10/1980 | Isenberg | 123/489 |
| 4,284,050 | 8/1981 | Suchowerskgj et al. | 123/489 |
| 4,287,865 | 9/1981 | Seitz | 123/489 |

*Primary Examiner*—Raymond A. Nelli
*Attorney, Agent, or Firm*—Edwin E. Greigg

[57] ABSTRACT

A method and apparatus for closed-loop control of the air number λ in self-igniting internal combustion engines, wherein with the aid of an ion current sensor disposed in the immediate vicinity of an outlet valve, the extent of the post combustion reaction of the exiting exhaust gases is detected and the ion current produced is compared with a set-point value, which lies within the ion current characteristic curve, which sharply drops within the air number range of λ=1.0–1.5. In accordance with the result of the comparison, one component of the operating mixture of the engine is varied in amount in corrective fashion, so that the set-point value of the ion current is maintained and thus the permissible soot number of the exhaust gas is not exceeded.

15 Claims, 5 Drawing Figures

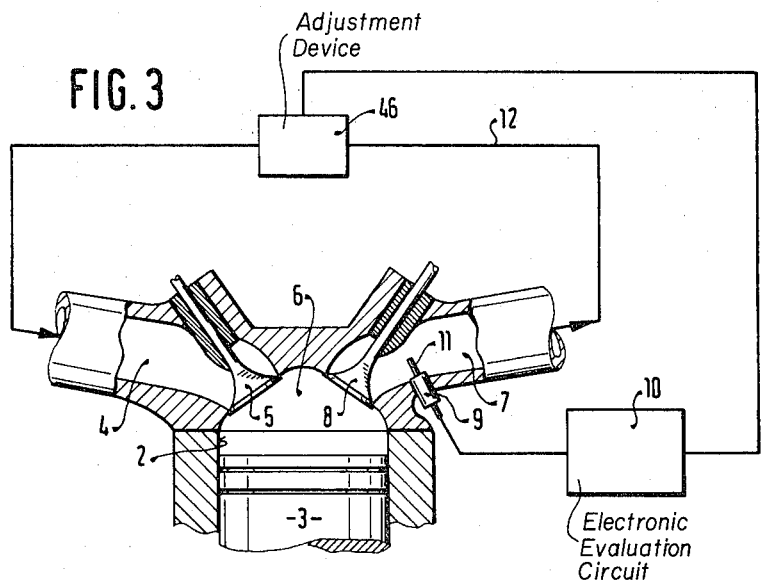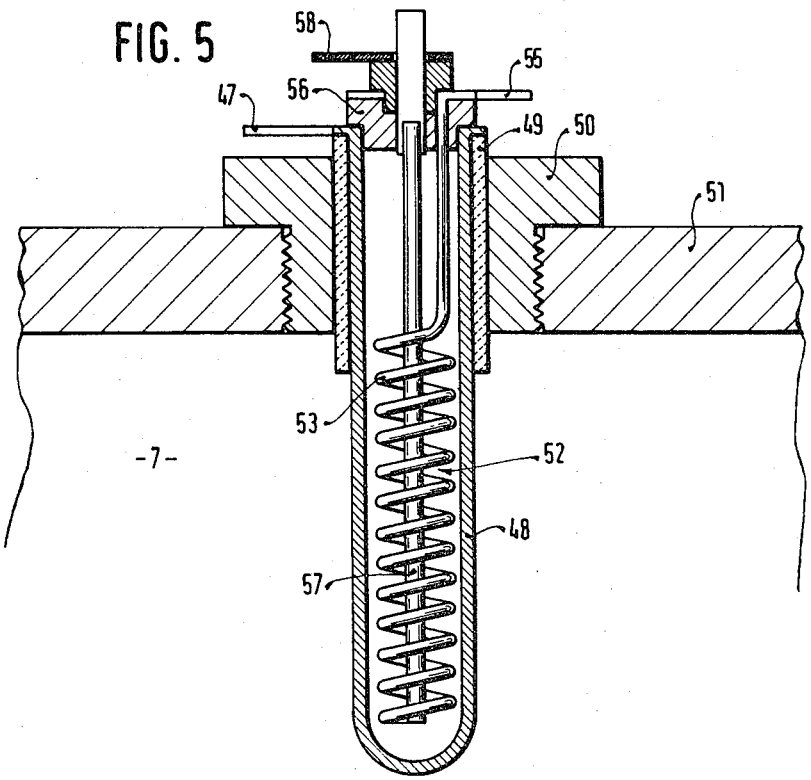

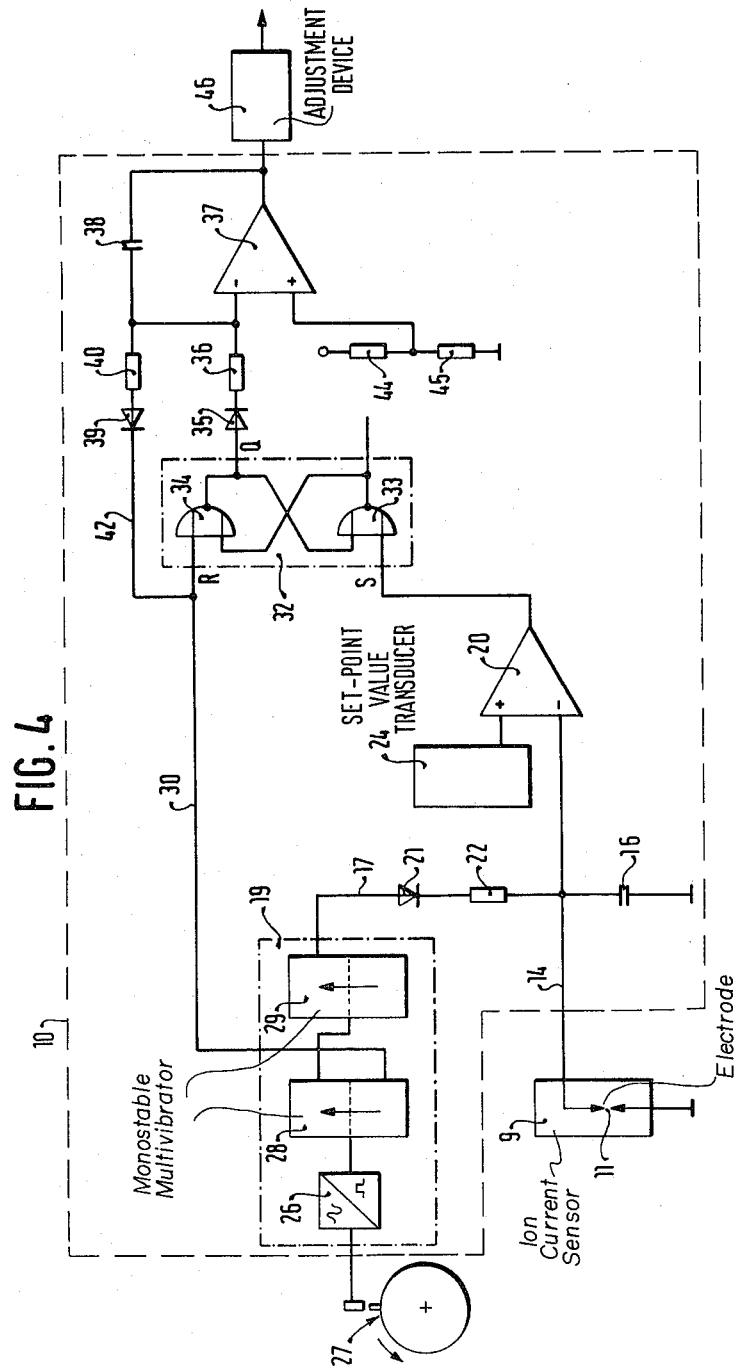

METHOD AND APPARATUS FOR CLOSED-LOOP CONTROL OF THE AIR NUMBER IN A SELF-IGNITING INTERNAL COMBUSTION ENGINE

BACKGROUND OF THE INVENTION

From German Offenlegungsschrift No. (laid-open application) 25 54 988, which corresponds to U.S. patent application, Ser. No. 747,676, filed Dec. 6, 1976 and commonly assigned with the present application it is known to detect post combustion reaction exhaust gases leaving the combustion chamber with the aid of an ion current sensor disposed directly downstream of the outlet valves, and to control the air number $\lambda$ of the operating mixture delivered for combustion to the engine in a closed-loop fashion in accordance with the output signal of the ion current sensor when compared with an appropriate set-point value.

This closed-loop control method is used in an internal combustion engine having externally supplied ignition. In essence, it is the sharp increase in the ion current at the lean running limit of the engine which is evaluated. There, because of the very large air excess, the hydrocarbon content of the exhaust gas increases greatly, and because of the poor ignitability of the mixture, delayed combustion occurs more frequently. This is generally the cause of the increase of the ion current at the lean running limit. A further increase in the ion current, although less well-defined, is observed according to the publication referred to above in ranges for $\lambda$ of less than 1. However, the post combustion reaction range is limited by the free oxygen content in the exhaust gas, since the mixture itself is less than stoichiometric, so even this increase is not well-defined.

It is also known that self-igniting engines, upon approaching the air number 1, have a sharply increasing soot emission in the exhaust gas. Accordingly, in order to stay within the prescribed emission limits, it is necessary, in self-igniting engines, to maintain a sufficient safety margin for this increase in soot emission.

Furthermore, it is known to operate self-igniting engines in the air number ranges associated with the running limit in externally ignited engines, i.e., with large excesses of air, without producing interruptions in operation. This can be used for closed-loop control purposes. The sufficiently large safety margin from the air number $\lambda$ associated with this operation, which must be maintained to prevent smoke in the exhaust, is, however, disadvantageous. Because the output produced by the engine increases as the air number $\lambda=1$ is approached, the result is a reduced exploitation of the output capacity of the engine.

OBJECT, SUMMARY AND ADVANTAGES OF THE INVENTION

It is an object of the invention to improve the operation of a self-igniting internal combustion engine in terms of soot emissions without producing operating interruptions and while maintaining an optimum operating mixture.

The invention has both a method and apparatus aspect according to which the ion current associated with post combustion reaction of the various gas components of the exhaust gas exhausted from the engine is detected and utilized in a closed-loop control fashion to control an adjustment device for adjusting the composition of the operating mixture and consequently the air number $\lambda$.

The method and apparatus according to the invention offers the advantage of operating self-igniting engines at a substantially closer approach to the soot limit while maintaining appropriate air number values with sufficient reliability. In so doing, other parameters which affect soot formation are automatically taken into consideration, such as air temperature, humidity, or combustion chamber temperature. Even with scattered soot values in various engines, resulting from different compression ratios required for different manufacturing tolerances, the air number $\lambda$ which is precisely that required can still be reliably maintained with the method according to the invention. Furthermore, the output of these self-ignited engines is increased on an average as a result of the greater fuel enrichment enabled by the method according to the invention.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 shows the arrangement of an ion current sensor with the aid of a schematically illustrated exemplary embodiment;

FIG. 4 illustrates an exemplary embodiment of an evaluation circuit for the sensor signal; and FIG. 5 is a cross-sectional view of one embodiment of an ion current sensor with electric heating.

DESCRIPTION OF THE PREFERRED EMBODIMENT

Figure 1:
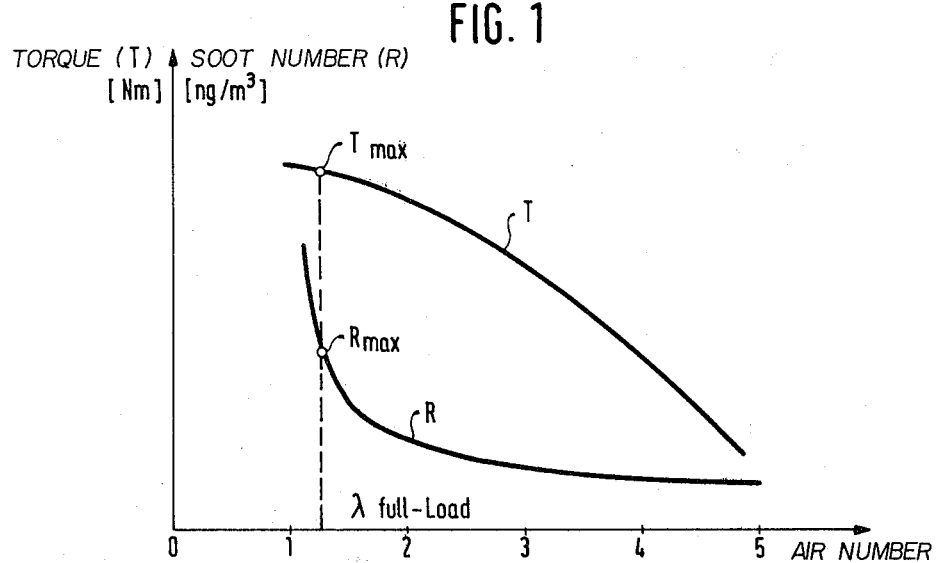
FIG. 1 is a diagram illustrating the interrelationship between torque output and soot formation in accordance with the air number $\lambda$.

With self-igniting engines, the maximum attainable output is determined by the soot emission, which increases as the air number decreases. In FIG. 1, the association of torque T, soot number R and air number $\lambda$ is shown. From this diagram, it can be seen that in the air number range of $\lambda=1.2-1.3$, the emission of soot increases sharply. Prior to this range, the torque curve T has its maximum value for an air number of $\lambda<1.2-1.3$. The torque would increase further with further enrichment of the operating mixture. However, combustion would then be so incomplete that soot would appear in the exhaust in substantial amounts. In order to avoid this soot formation, which pollutes the environment and restricts vehicle traffic safety, it has been determined that a maximum value for soot, $R_{max}$, should not be exceeded. With fuel enrichment about the air number 1.2, for the specific case being discussed here by way of example, the insufficient availability of oxygen in self-igniting engines causes a sharp increase in soot content and an equally sharp increase in CO content. At the same time, the emission of hydrocarbons increases, although less sharply, because large amounts of the hydrocarbons are absorbed by the soot which is precipitating out in increased quantity.

Figure 2:
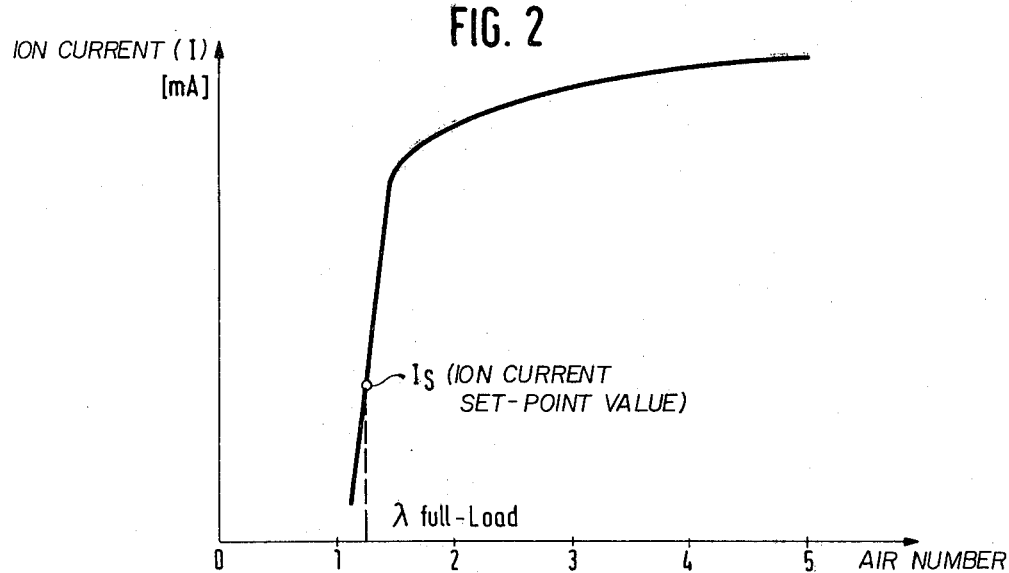
FIG. 2 is a diagram illustrating the ion current in accordance with the air number $\lambda$.

In FIG. 2, the ion current measured by an ion current sensor disposed directly adjacent to an outlet valve of a cylinder is shown in accordance with the air number $\lambda$. It will be appreciated that the ion current is reduced here to the same extent, analogous to the increase in the soot content of the exhaust (FIG. 1). With increasing fuel enrichment of the operating mixture, a reduced post combustion reaction takes place behind the hot outlet valve, because, as noted above, a portion of the exiting hydrocarbons is absorbed by the soot. These absorbed hydrocarbons are, in particular, those having a high boiling point, in other words, those which would easily oxidize thereafter at the outlet valve.

FIG. 3 shows by way of example the disposition of an ion current sensor with which ion currents in accordance with FIG. 2 can be measured. A portion of an engine cylinder 2 within which a piston 3 reciprocates is shown in simplified fashion. The combustion chamber 6 partly defined by the piston 3 communicates via an inlet valve 5 with an intake tube 4 and via an outlet valve 8 with an exhaust line 7. The ion current sensor 9 is disposed directly downstream of the outlet valve 8. The ion current sensor 9 has an electrode 11 which is insulated relative to ground. If a voltage is now applied between ground and the electrode 11 an ion current results as soon as an after-burning occurs in the region of the electrode 11, thus ionizing the exiting gas components. In order to maintain an ion current of this kind, a relatively low voltage is sufficient, such as the battery voltage of an engine being operated in a motor vehicle. An increase of the ion current with the same degree of ionization of the gases flowing past is attained by enlarging the ion-receiving surface area of the electrode or by increasing the measurement voltage applied.

The characteristic curve of the ion current shown in FIG. 2 was generated from ion currents measured at various operational points of the engine and integrated or averaged over one cycle of the engine. Integration over the course of one cycle is necessary because the after-burning which occurs is at a maximum at quite different times. Also, there are widely varying increases in the reactions and in the resulting ion currents over the course of one cycle. The illustrated curve is all the better defined, the closer the ion current sensor is disposed to the exit points of the exhaust gases from the combustion chamber 6 at the outlet valve 8. This is also due to the turbulent mixing of the exhaust gases behind the outlet valve, as a result of which the reaction of uncombusted fuel with oxygen is promoted. The outlet valve then acts as a flame holder.

The coincidence of the ion current drop, upon approaching the air number $\lambda=1$, with the increase in soot emission at the same point makes it possible, with the aid of the ion current signal, to hold the soot value to the maximum permissible value of $R_{max}$. As the threshold value, an ion current set-point value $I_S$ is selected which is intended to be maintained especially in full-load operation of the self-igniting engine.

An electronic evaluation circuit 10 for the ion currents detected by an ion current sensor is shown broadly in FIG. 3 and in more detail in FIG. 4 for the closed-loop control of the operating mixture to be combusted in an internal combustion engine. The ion current sensor 9 has a middle electrode 11, as shown in FIG. 3, to which a measurement voltage is applied relative to ground. A well-insulated, shielded line 14 leads from the electrode 11 to a capacitor 16 connected to ground and from there to the inverting input of a comparator 20. The capacitor 16 is furthermore connected via a connecting line 17 to a control circuit 19. The capacitor 16 is periodically chargeable via connecting line 17 and furnishes the measurement voltage for the ion current sensor 9. A diode 21 is included for charging purposes in the path of the capacitor 16, followed by a limiting resistor 22.

The non-inverting input of the comparator 20 is connected with a set-point value transducer 24, and the opportunity exists of varying the set-point value in accordance with operational parameters of the engine. The control circuit 19 is provided for determining the charging of the capacitor. The control circuit 19 contains a pulse shaper circuit 26, which receives control pulses from a pulse transducer, for instance a transducer 27 for top dead center. The control pulses have an rpm-dependent frequency and they are converted by the pulse shaper circuit 26 into rectangular pulses having an rpm-dependent frequency. These pulses are delivered to the input of a first monostable multivibrator 28, whose output when triggered is connected with the input of a second monostable multivibrator 29, and whose complementary output, corresponding to the resting stable state of the multivibrator, is connected via a line 30 with a bistable multivibrator 32. The connecting line 17 branches off from the triggering output of the second monostable multivibrator 29.

The output of the comparator 20 is connected with the other input, that is, the set input S, of the bistable multivibrator 32. The bistable multivibrator 32 is designed in a known manner, in this instance comprising, for example, two NOR gates 33 and 34, with the reset input R of the gate 34 being connected with the line 30, and the output Q being connected via a diode 35 and a resistor 36 with the inverting input of an operational amplifier 37. The operational amplifier 37 exhibits integrative behavior as a result of the feedback connection of its output via an integrating capacitor 38 with the inverting input. The diode 35 is switched in the current flow direction toward the operational amplifier. Parallel thereto, in the opposite direction, in the branch line 42, there is a diode 39 with a resistor 40 leading back to the line 30 from the inverting input of the operational amplifier 37.

The other input of the operational amplifier 37 is connected with a voltage divider comprising the resistors 44 and 45. The output of the amplifier 37 leads to an adjustment device 46, by means of which the position of a full-load stop, not shown, of the fuel quantity adjustment member of a fuel injection pump, also not shown, can be varied. On the other hand, the quantity of recirculated exhaust gas or the instant of injection as well can be varied with the adjustment device 46 (FIG. 5), and thus, an influence can be exerted upon the air number $\lambda$.

The apparatus functions as follows:

In accordance with the pulses generated in the pulse shaper circuit 26, which have an rpm-dependent frequency, pulses are obtained at the output of the first monostable multivibrator 28 which have the same frequency and a definite pulse width, and pulses are obtained at the output of the second monostable multivibrator 29 which are phase-displaced by one pulse width relative to the pulses of the first multivibrator 28. The capacitor 16 is periodically charged via the diode 21 by means of these pulses of definite width, which abruptly increase from 0 up to battery voltage. In the intervals between pulses, the capacitor can discharge via the electrode of the sensor 9, in accordance with the intensity of the ion current appearing at that time. A discharge via the connecting line 17 is prevented by the diode 21, while a discharge via the comparator 20 is prevented by the high-ohmic input thereof. Now, whenever the voltage at the capacitor 16 drops during the course of the discharging process below a predetermined threshold voltage, then the comparator 20 switches through and carries a voltage, as signal 1, to the set input S of the bistable multivibrator 32.

Pulses which are dropping from 1 to 0 are carried from the complementary output of the first monostable multivibrator 28 via the line 30 to the reset input R of the bistable multivibrator 32. As long as the pulse lasts, and not until the signal 1 is applied to the set input S, the multivibrator 32 can be triggered, so that the signal 1 is present in turn at the Q output of the NOR gate 34 for the duration of the signal 1 generated by the comparator 20. The output of the comparator 20 becomes zero, however, at the instant when the capacitor 16 is again fully charged via the connecting line 17.

Because the non-inverting input of the operational amplifier 37 is at a potential between battery voltage—that is, the signal 1—and zero, current flows through the return flow line 42 so long as the signal 1 is present in the line 30. However, if the signal 0 is present there, then a current flows which is determined by the resistance of the resistor 40. This is true for the duration of the triggering process of the first monostable multivibrator 28. Now if the signal 0 is present at the output of the bistable multivibrator 32 during this period, because of the absence of a signal 1 from the comparator 20, then a current flows out of the operational amplifier 37 via the return flow line 42 to the line 30. If, in contrast, the signal 1 is present at the output of the bistable multivibrator 32, then a current flows across the resistor 36 which is determined by this resistor 36; this current then subsequently divides into a partial current flowing through the return flow line 42 and a partial current which flows to the operational amplifier 37. To this end, the resistor 36 is of lesser resistance than the resistor 40.

With this switching apparatus integration is performed both in the positive direction and in the negative direction in accordance with the signal produced by the comparator 20. The steepness of the slope of the particular integrating direction is determined by the resistance of the pertinent resistors 40 and 36, respectively. As a result of this arrangement, various time constants can be generated. Because of the non-symmetrical realization of the integrator, operational points can be established as an average which cause a λ shift to higher and lower values, respectively, than the established λ value within the rising curve of the ion current.

With an adjustment device adapted to the prevailing conditions, which may be a lifting magnet or a servomotor, the dispensing of one of the components of the operating mixture of the engine is influenced in accordance with the output signal of the integrator 37, 38, in order to vary the air number λ. Preferably, this is done during full-load operation, because in a conventionally operated, self-igniting internal combustion engine a close approach to an air number of λ=1 occurs only in this operational range. By means of the adjustment device 46, either the full-load stop can be varied in a suitable manner, or else influence can be exerted on the aspirated air quantity as well. This is preferably effected by controlling the recirculated exhaust gas quantities as shown in FIG. 3. The advantage of such control is that other toxic substances in the exhaust, such as $NO_x$, are also reduced.

In FIG. 5, an exemplary embodiment of an ion current sensor, such as the sensor 9, is shown. It comprises a metal hollow tube 48 closed at one end, which extends into the exhaust line 7 and represents the electrode 11. At the other end, the ion current sensor has a holder 50, which, by way of example, is threadedly inserted into the wall 51 of the exhaust line 7. A ceramic insulator 49 is provided between the holder 50 and the metal tube 48. A connection 47 is provided on the side of the metal tube 48 located outside of the exhaust line 7, and the measurement voltage is applied between the connection 47 and the metal wall 51 of the exhaust line 7.

On the inside of the metal tube 48, an electric heating device 52 having a heating coil 53 is inserted through the open end. The heating device 52 is designed such that a first connection line 55 leads into the interior of the metal tube 48, parallel to its axis, through an insulating piece 56 which closes the metal tube 48. Beyond the portion of the metal tube 48 which extends into the exhaust gas flow, the connection line 55 becomes the heating coil 53, which leads to the closed end of the metal tube 48 without coming into electrically conductive contact with the metal tube 48.

The heating coil 53 of the heating device 52 is preferably made of PTC metal, which has the property of automatically shutting off the heating current when coil overheating is threatened. With the ion current sensor heated in this manner, the formation of deposits thereon, which can restrict the functioning of the sensor, is prevented.

When the fuel quantity adjustment member of the fuel injection pump providing the engine with fuel performs rapid movements, there is the danger of sudden soot emission, especially at high exhaust feedback rates, because the quantity of oxygen supplied to the engine is for a brief time insufficient for complete combustion. Accordingly, it is advantageous for a compensation device to be provided in addition to the above-described closed-loop control device. This compensation device effects a brief, controlled preadjustment of the value for the maximum fuel injection quantity or the maximum exhaust recirculation quantity, thus avoiding the sudden emission of soot. This device responds to the adjustment speed of the quantity adjustment member in the direction of an additional fuel quantity; this control variable can also be a derived variable, such as the intake tube pressure. Compensation devices of this kind are known, for example from German Offenlegungsschriften (laid-open applications) Nos. 27 41 834 and 26 58 051, and insert corresponding to U.S. Pat. Nos. 4,205,645 and 4,143,631, respectively.

With the described method and the described apparatus for performing the method of the invention, it is possible to operate a self-igniting engine, especially at full-load, with the smallest possible air number λ, in the immediate vicinity of the soot limit. There is no need to fear that a change in other parameters, such as air temperature, air pressure, humidity, fuel quality, combustion chamber temperature and others, which affect the combustion and the tendency to soot formation, will cause the permissible soot value to be exceeded. It is furthermore possible to exploit the output available from the engine to a fuller extent.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for the closed-loop control of the air number λ of the operating mixture for combustion in a self-igniting internal combustion engine, comprising the steps of:
- detecting the ion current associated with a permissible soot number of the exhaust gas exhausted from the engine with at least one ion current sensor located in the immediate vicinity of an outlet valve of the engine;
- generating a set-point value of the ion current which corresponds to the value of the ion current in the range of λ=1.0-1.5, said ion current increasing sharply in this air number range;
- comparing the detected ion current with the set-point value in a closed-loop control device and establishing a deviation of the detected ion current from the set-point value; and
- adjusting the composition of the operating mixture and consequently the air number λ as a function of the deviation, whereby the set-point valve of the ion current is maintained and the permissible soot number of the exhaust gas is not exceeded.

2. The method as defined in claim 1, wherein the maximum amount of the fuel is controlled by the deviation in a closed-loop fashion.

3. The method as defined in claim 1, wherein the minimum air number λ is controlled by the deviation in a closed-loop fashion.

4. The method as defined in claim 3, wherein the quantity of the recirculated exhaust gas component of the operating mixture is controlled by the deviation for the purpose of controlling the minimum air number λ.

5. The method as defined in claim 1, wherein the detected ion currents are periodically integrated, in particular over the course of one cycle of one piston of the engine, and the integrated value is compared to the set-point value.

6. An apparatus for the closed-loop control of the air number λ of the operating mixture for combustion in a self-igniting internal combustion engine, comprising:
- an ion current sensor disposed in the immediate vicinity of an outlet value of one of the engine cylinders, said ion current sensor detecting, during a measurement interval, the ion current associated with a permissible soot number of the exhaust gas exhausted from the engine;
- means for generating a set-point value of the ion current which corresponds to the value of the ion current in the range of λ=1.0-1.5, said ion current increasing sharply in this air number range;
- a comparator circuit connected to the ion current sensor and the means for generating a set-point value for comparing the detected ion current with the set-point value and establishing a deviation of the detected ion current from the set-point value; and
- an adjustment device connected to the comparator circuit for adjusting the composition of the operating mixture and consequently the air number λ as a function of the deviation, whereby the set-point value of the ion current is maintained and the permissible soot number of the exhaust gas is not exceeded.

7. The apparatus as defined in claim 6, wherein the adjustment device adjusts the position of the full-load stop of the fuel quantity adjustment member of a fuel injection pump supplying the engine.

8. The apparatus as defined in claim 6, wherein the adjustment device adjusts the quantity of the recirculated exhaust gas in proportion to the aspirated fresh-air quantity.

9. The apparatus as defined in claim 6, further comprising:
- a compensation device responding to the adjustment speed of the fuel quantity adjustment member of the fuel injection pump, upon the occurrence of an increase in the fuel dispensed for providing a pre-adjustment control for the maximum injection fuel quantity.

10. The apparatus as defined in claim 6, further comprising:
- a compensation device responding to the adjustment speed of the fuel quantity adjustment member of the fuel injection pump, upon the occurrence of an increase in the fuel dispensed for providing a pre-adjustment control for the maximum recirculated exhaust gas quantity.

11. The apparatus as defined in claim 6, wherein the ion current sensor includes: a closed hollow body of electrically conductive material extending into the exhaust gas flow; and insulating mounting for mounting the closed hollow body in the immediate vicinity of the outlet valve; and a heating device mounted in the interior of the closed hollow body.

12. The apparatus as defined in claim 11, wherein the heating device is an electrical resistance heating device, which is electrically insulated relative to the closed hollow body.

13. The apparatus as defined in claim 12, wherein the electrical resistance heating device comprises PTC material.

14. An apparatus for the closed-loop control of the air number of the operating mixture for combustion in a self-igniting internal combustion engine, comprising:
- a crankshaft angle transducer;
- an ion current sensor disposed in the immediate vicinity of an outlet value of one of the engine cylinders, said ion current sensor detecting, during a measurement interval, the ion current associated with the post-combustion reaction of the various gas components of the exhaust gas exhausted from the engine;
- means for generating a set-point value of the ion current which corresponds to the value of the ion current in the range of λ=1.0-1.5, said ion current increasing sharply in this air number range;
- a comparator circuit connected to the ion current sensor and the means for generating a set-point value for comparing the detected ion current with the set-point value and establishing a deviation of the detected ion current from the set-point value;
- an integrating device connected to the ion current sensor and to the comparator circuit; and
- a control circuit connected to the crankshaft angle transducer and to the integrating device, said control circuit being rendered rpm-dependent by the crankshaft angle transducer, wherein the integrating device is switched between the comparator circuit and the ion current sensor as a result of which the integrating device is set at the beginning of each measurement interval and as a result of which the comparator circuit establishes the deviation of the detected ion current from the set-point value; and
- an adjustment device connected to the comparator circuit for adjusting the composition of the operating mixture and consequently the air number λ as a function of the deviation.

15. The apparatus as defined in claim 14, further comprising:
a gate circuit connected to the control circuit and to the comparator circuit,
wherein said integrating device comprises an integrating circuit connected to the gate circuit and to the adjustment device, whereby the gate circuit generates an output applied to the integrating circuit when the deviation of the detected ion current from the set-point value appears at the output of the comparator circuit and a predetermined state of the control circuit is reached, and wherein the integrating circuit integrates the output from the gate circuit which is applied to the adjustment device.

* * * * *